United States Patent [19]

Serafini

[11] 4,137,552
[45] Jan. 30, 1979

[54] AUTOMATIC BEAM CURRENT LIMITER WITH INDEPENDENTLY DETERMINED THRESHOLD LEVEL AND DYNAMIC CONTROL RANGE

[75] Inventor: Joseph J. Serafini, Indianapolis, Ind.

[73] Assignee: RCA Corporation, New York, N.Y.

[21] Appl. No.: 794,126

[22] Filed: May 5, 1977

[51] Int. Cl.² .......................... H04N 5/68; H04N 9/16
[52] U.S. Cl. ...................................... 358/243; 358/74
[58] Field of Search ................... 358/243, 74

[56] References Cited
U.S. PATENT DOCUMENTS

| | | | |
|---|---|---|---|
| 3,674,932 | 7/1972 | Griepentrog | 358/243 |
| 3,804,981 | 4/1974 | Avins | 358/243 X |
| 3,914,545 | 10/1975 | Engel | 358/243 X |

OTHER PUBLICATIONS

Engineering Electronics by Ryder; McGraw-Hill Book Co., ©1957, pp. 183–188.

Primary Examiner—John C. Martin
Assistant Examiner—Aristotelis M. Psitos
Attorney, Agent, or Firm—Eugene M. Whitacre; William H. Meagher; Ronald H. Kurdyla

[57] ABSTRACT

Apparatus for automatically limiting excess beam current conduction of a kinescope in a television signal processing and reproducing system. A control network including an active device (e.g., a transistor) provides a control signal representative of the magnitude of beam current conduction when above a predetermined threshold level. A dynamic operating control range of the active device is determined independent of a threshold control level of the active device by means of a degenerative direct current feedback network associated with the active device. The control signal is coupled to the kinescope for opposing excess current conduction thereof.

14 Claims, 1 Drawing Figure

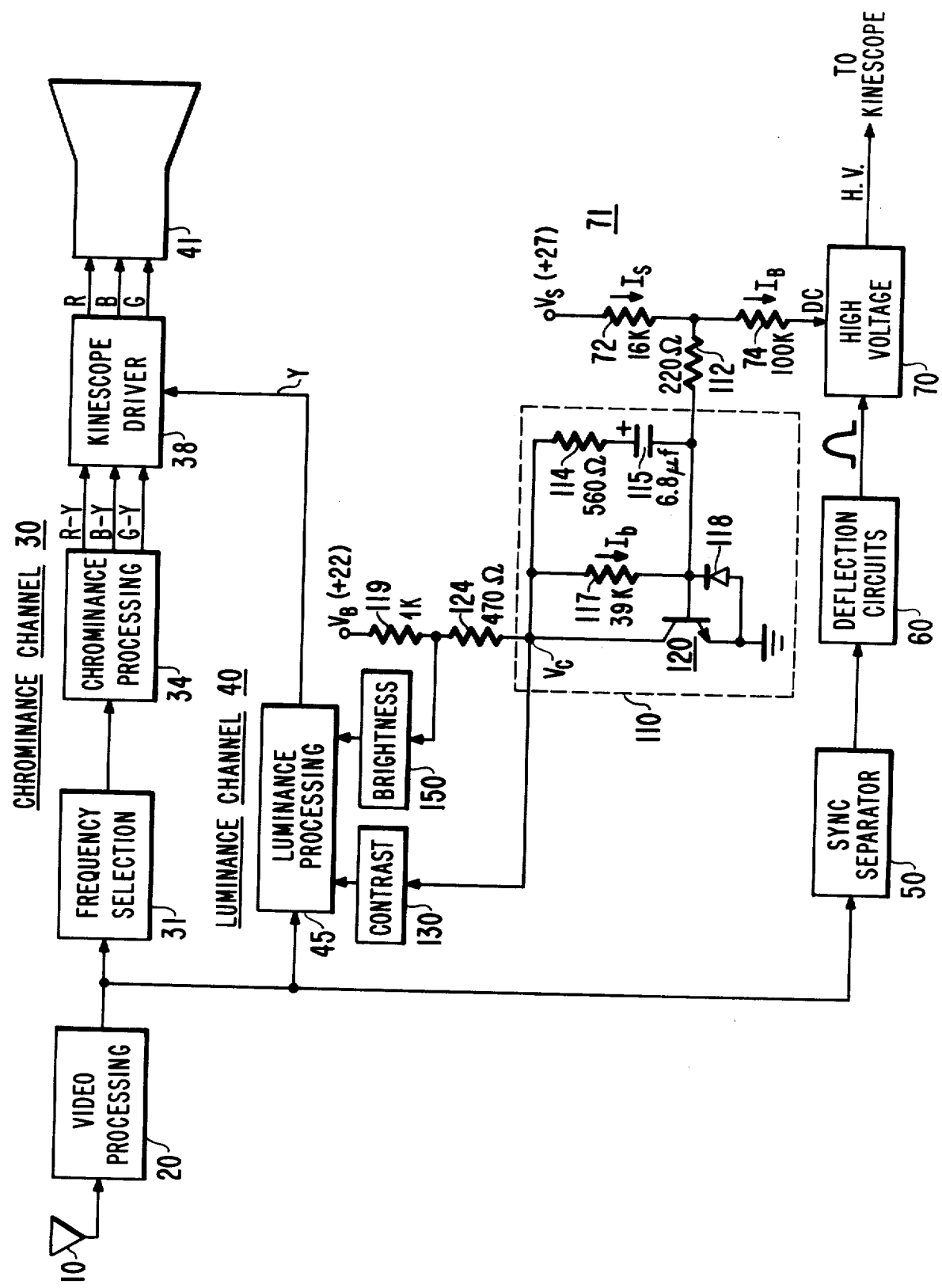

AUTOMATIC BEAM CURRENT LIMITER WITH INDEPENDENTLY DETERMINED THRESHOLD LEVEL AND DYNAMIC CONTROL RANGE

This invention relates to apparatus for automatically limiting the electron beam current drawn by an image reproducing device such as a kinescope of a television receiver and, more particularly, to such apparatus employing an active control device having a dynamic control range which can be established independent of a threshold control level.

Excessive beam currents can cause a kinescope of a television receiver to produce a degraded image. In this regard, excessive beam currents can cause degradation of the performance of a deflection system of the receiver, electron beam spot defocussing and picture blooming. Excessive beam currents also can exceed the safe operating current capability of the kinescope, possibly damaging the kinescope and associated circuit components.

Automatic beam current limiter or automatic brightness limiter circuits employing an active control device are known. For example, such beam limiter circuits are described in U.S. Pat. No. 3,674,932 (D. F. Griepentrog) and in copending U.S. patent application Ser. No. 715,861 entitled "Automatic Beam Current Limiter" of M. N. Norman, filed Aug. 19, 1976, and now U.S. Pat. No. 4,067,048 both assigned to the same assignee as the present invention.

An active device (e.g., a transistor) employed as a control element in an automatic beam limiter circuit typically is responsive to excessive beam current for providing a control signal representative of the excess beam current. The control signal is applied, for example, to video signal processing circuits of the receiver to control the D.C. level or peak amplitude of the video signal in a direction to oppose excessive beam current produced in response to the video signal.

Two parameters typically are associated with the design and operation of an automatic beam current limiter including an active control device. One parameter is a predetermined dynamic control range during the beam limiting mode of operation, and another parameter is a predetermined threshold level of beam current above which it is desired to limit beam current. It is desirable for the dynamic control range and the threshold control level to be capable of mutually independent determination so that these operating parameters can be tailored independently to suit the specific requirements of a particular image reproducing system.

Also, it is advantageous for the beam current limiter to be capable of operation in conjunction with relatively low voltage sources of potential. Such sources can be closely regulated, thereby promoting more accurate control of the operation of the beam limiter.

Apparatus in accordance with the present invention includes an automatic beam current limiter in a system for processing image representative video signals, such system having a video signal transmission channel and an image reproducing device for reproducing an image in response to video signals transmitted via the channel. Means are included for providing a signal representative of the magnitude of beam current drawn by the image reproducing device, and for determining a threshold level of the representative signal above which it is desired to oppose increases in beam current. An active current conducting device is responsive to the representative signal for providing an output control signal indicative of the magnitude of beam current when the threshold level is exceeded. A degenerative direct current feedback network associated with the active device serves to determine a dynamic operating control range of the active device, of a magnitude independent of the threshold level, when the threshold level is exceeded. The output control signal is coupled to the image reproducing device to oppose increasing current conduction thereof in accordance with the magnitude of the control signal.

The single FIGURE of the drawing shows, partially in block diagram form and partially in schematic circuit diagram form, a general arrangement of a color television receiver employing a circuit constructed in accordance with the present invention.

In the drawing, a video signal processing unit 20 is responsive to radio frequency composite television signals received from an antenna 10. Video processing unit 20 generates, by means of suitable intermediate frequency circuits and detection circuits (not shown), a composite video signal containing chrominance, luminance, sound and synchronizing signal components. An output of video processor 20 is coupled to a chrominance channel 30, a luminance channel 40, and a sync separator 50.

Chrominance channel 30 includes a frequency selection unit 31 for selectively coupling the chrominance component to a chrominance processing unit 34 for deriving R—Y, B—Y and G—Y color difference signals. The color difference signals are combined in a kinescope driver stage 38 with a luminance signal Y from luminance channel 40 to produce R, B and G color signals, which are then coupled to respective control electrodes of a kinescope 41.

A luminance processing unit 45 of luminance channel 40 serves to amplify and otherwise process the luminance component of the composite video signal. A contrast control unit 130 and a brightness control unit 150 are operatively associated with luminance processor 45, as will be discussed.

Periodic image synchronizing signals derived from the video signal by sync separator 50 are coupled to deflection circuits 60. High operating voltages for kinescope 41 are generated by a high voltage source 70 (e.g., a voltage multiplier) in response to positive periodic horizontal flyback signals from deflection circuits 60. A D.C. input of high voltage source 70 is coupled via a resistor 74 to a source of substantially constant current 71 comprising a current determining resistor 72 and a regulated source of positive D.C. voltage $V_S$ (+27 volts). A current $I_B$ flowing into the D.C. input of high voltage source 70 is representative of beam current demand of kinescope 41.

An automatic beam current limiting network comprises a dynamic control stage 110 operatively associated with luminance processor 45 via contrast control unit 130 and brightness control unit 150, as described in a copending, concurrently filed U.S. patent application Ser. No. 794,088 of R. L. Shanley, II entitled "Kinescope Beam Current Limiter Employing Sequential Control Of Image Contrast And Brightness To Limit Beam Current," assigned to the same assignee as the present invention.

Control stage 110 comprises a normally saturated, high current gain (e.g., Beta of 100 or more), common emitter NPN transistor 120. A collector output of transistor 120 is coupled to a control input of contrast control unit 130, and to a control input of brightness control unit 150 via a resistor 124. Resistor 124 and a resistor 119 comprise a collector load circuit for transistor 120 and are coupled to a regulated source of positive D.C. potential $V_B$ (+22 volts). A diode 118 shunting a base-emitter junction of transistor 120 serves to prevent reverse conduction breakdown of transistor 120. The gain of transistor 120 is stabilized by a collector-base alternating current negative feedback network comprising a resistor 114 and a capacitor 115. A resistor 117 coupled between the collector output and base input electrodes of transistor 120 provides degenerative D.C. feedback for transistor 120.

A substantially constant current $I_S$ of 1.64 milliamperes supplied by source 71 is a function of the value of voltage source $V_S$, the base-emitter voltage drop ($V_{BE}$) of transistor 120 and the value of resistor 72 ($R_{72}$) according to the expression $$I_S = \frac{V_S - V_{BE}}{R_{72}}$$

This current represents a predetermined maximum desired level of kinescope beam current demand under normal operating conditions.

Under normal operating conditions when beam current demand (as represented by current $I_B$ flowing into the D.C. input of high voltage source 70) is less than the level of current $I_S$, the current $I_S$ divides such that a portion of current $I_S$ flowing in the base of transistor 120 via resistor 112 is sufficient to maintain transistor 120 in a saturated condition. In this condition the collector voltage $V_C$ of transistor 120 approximates ground potential (i.e., zero volts), and contrast control unit 130 and brightness control unit 150 operate normally without influence from stage 110.

In the beam current limiting mode of operation when current $I_B$ demanded by high voltage source 70 substantially equals or exceeds the level of current $I_S$, base current drive for transistor 120 is diminished. Transistor 120 then comes out of saturation and operates in a linear, active region for providing beam current control. At this time, the collector control voltage $V_C$ of transistor 120 rises in proportion to the amount by which the conduction of transistor 120 diminishes while in the active region. The rising collector voltage causes a current $I_b$ to flow from the collector to the base of transistor 120 via resistor 117.

The current $I_b$ produced during the beam limiting mode divides into two portions. A first portion flows into the base of transistor 120 and provides bias for maintaining transistor 120 conductive in the active region. This base current portion of current $I_b$ is negligible due to the high current gain of transistor 120. A second portion of current $I_b$ flows into the D.C. input of high voltage source 70 via resistors 112 and 74. This current portion is representative of excess beam current demand above the threshold current level during the beam limiting mode of operation, since current source 71 does not supply additional current during this time.

The current $I_b$ is inversely proportional to the conduction of transistor 120 in the active region, and the magnitude of current $I_b$ corresponds to the level of beam current demand in excess of the predetermined level (i.e., current $I_S$). The output control voltage $V_C$ is proportional to current $I_b$ and is equal to the sum of the voltage drop across resistor 117 and the base-emitter voltage drop of transistor 120, which is essentially constant while transistor 120 is conductive in the active region.

The control signal $V_C$ developed at the collector of transistor 120 is representative of average rather than instantaneous or peak beam current demand. This is accomplished by virtue of the A.C. feedback network including capacitor 115. Since capacitor 115 presents a low impedance to an alternating or instantaneous signal component which may appear at the collector of transistor 120, such alternating component is coupled to the base electrode of transistor 120 via capacitor 115. An amplified version of this first occurring, A.C. coupled alternating component then appears at the collector of transistor 120 and cancels with the first occurring alternating component.

It is noted that the threshold current ($I_S$) at which beam current limiting commences can be modified to suit the requirements of a particular system by selecting an appropriate value of resistor 72. Also, the magnitude of the dynamic beam limiting control range, and the D.C. gain of transistor 120 within the control range, can be modified by tailoring the value of resistor 117. The values of resistors 72 and 117, and therefore the threshold level and control range, can advantageously be determined in mutually independent fashion. Also with the described arrangement, voltage source $V_S$ associated with current supply 71 can be of a relatively low magnitude susceptible of close regulation, thereby assisting to establish an accurately determined threshold current $I_S$.

The limit of the dynamic control range of transistor 120 is established by the maximum value of voltage $V_C$ as determined by the maximum value of current $I_b$. The maximum value of current $I_b$ is related to the values of voltage source $V_B$, resistor 119 ($R_{119}$), resistor 117 ($R_{117}$), resistor 124 ($R_{124}$) and the base-emitter voltage drop of transistor 120 ($V_{BE}$, approximately 0.6 volts) according to the expression $$I_{b(MAX)} = \frac{V_B - V_{BE}}{R_{119} + R_{124} + R_{117}}$$

or 0.53 milliamperes in this example. Thus control stage 110 will oppose beam current demand which exceeds the predetermined level of current $I_S$ by an amount up to 0.53 milliamperes. That is, control stage 110 serves to oppose current demanded by high voltage unit 70 within a range of approximately 1.64 to 2.17 milliamperes in this example.

The control voltage $V_C$ appearing at the collector of transistor 120 in the beam limiting mode, and the corresponding control voltage appearing at the junction of resistors 119 and 124 during this time, respectively serve to control the operation of contrast and brightness control units 130 and 150 so as to oppose excess beam currents above the predetermined level. This manner of operation is described in greater detail in the copending, concurrently filed application of R. L. Shanley, II, mentioned previously.

Briefly, when beam current demand exceeds the predetermined value by an amount within a first range of beam current, the control voltage $V_C$ serves to adjust the operation of contrast unit 130 to vary the peak amplitude of the video signal processed by luminance processor 45 in a direction to oppose excess beam current above the predetermined level. The corresponding control voltage then appearing at the junction of resistors 119 and 124 is ineffective to alter the normal operation of brightness control unit 150 at this time. When beam current demand exceeds the predetermined level by a relatively greater amount within a second range of beam current, the control voltage $V_C$ serves to vary the peak amplitude of the video signal as mentioned above, and the corresponding control voltage then appearing at the junction of resistors 119 and 124 is effective to adjust the operation of brightness control unit 150 so that the D.C. level of the video signal processed by unit 45 also is varied in a direction to oppose excess beam current above the predetermined level. Thus in the latter case, the control voltage provided by transistor 120 serves to vary both the peak amplitude, representative of image contrast, and the D.C. level, representative of image brightness, of the luminance signal in a direction to oppose excessive beam currents.

Although the present invention has been described with reference to a particular circuit embodiment, other arrangements are possible within the scope of the invention. For example, control stage 110 can be adapted to include a PNP control transistor, and various other arrangements can be devised for providing a current or signal representative of the beam current demand of the kinescope.

What is claimed is:

1. In a system for processing image representative video signals, said system including a video signal transmission channel and an image reproducing device for reproducing an image in response to video signals transmitted via said channel, apparatus comprising:
    a source of current of a given level coupled to said image device for supplying beam current thereto in accordance with the current demand of this device below a threshold level, said given current level corresponding to said threshold level above which it is desired to oppose increases in beam current;
    means for deriving a control signal representative of the magnitude of beam current when said threshold level is exceeded, including
        active current conducting means having an input coupled to said current source, and an output for providing said control signal;
        means for providing degenerative direct current feedback coupled from said output to said input of said active means to determine, for said active means, a dynamic operating control range when said threshold level is exceeded; and wherein
    feedback current provided by said feedback means is proportional to the level of beam current demand in excess of said threshold level, and is supplied to said input of said active means to determine the operation of said active means within said control range and to said image device as additional beam current when said threshold current level is exceeded; and
    means for coupling said output control signal to said image reproducing device to oppose increasing current conduction thereof in accordance with the magnitude of said control signal.

2. Apparatus according to claim 1, wherein:
    said active means comprises a transistor having an input electrode coupled to said source of current, an output electrode for providing said control signal, and a common electrode.

3. Apparatus according to claim 2, wherein:
    said input, output and common electrodes correspond to base, collector and emitter electrodes, respectively, and
    said means for providing degenerative direct current feedback comprises a first impedance of predetermined magnitude coupled from said collector to said base electrode.

4. Apparatus according to claim 3 and further comprising:
    alternating current coupling means coupled between said collector and base electrodes.

5. Apparatus according to claim 4, wherein:
    said alternating current coupling means comprises a capacitance.

6. Apparatus according to claim 3, wherein:
    said source of current coupled to said base input electrode of said transistor and to said image reproducing device supplies a current of substantially constant magnitude, said current dividing between said base input and said image device in accordance with the current demand of said image device when said current demand is less than said threshold level.

7. Apparatus according to claim 6, and further comprising:
    means for supplying high operating voltages for said image reproducing device, having an input coupled to said source of current and an output coupled to said image reproducing device, current supplied to said input of said high voltage means being representative of current drawn by said image reproducing device.

8. Apparatus according to claim 6, wherein:
    said source of current comprises a source of potential and a current determining second impedance of predetermined magnitude for establishing said threshold level.

9. Apparatus according to claim 8, wherein:
    said first and second impedances each comprise a resistance.

10. In a television system for processing image representative television signals, said system including a television signal transmission channel, a kinescope for reproducing an image in response to television signals transmitted via said channel, and high voltage supply means for providing operating potential for said kinescope, apparatus comprising:
    a source of current of a given level coupled to said high voltage means for supplying currents representative of the magnitude of beam current drawn by said kinescope from said high voltage supply means below a threshold level, said given current level corresponding to said threshold level above which it is desired to oppose increases in current;
    means for deriving a control signal representative of the magnitude of beam current when said threshold level is exceeded, including
        amplifier means having an input coupled to said source of current, and an output for providing said control signal;
        an impedance direct current coupled from said output to said input of said amplifier to determine, for said amplifier means, a dynamic operating control range a magnitude independent of said threshold when said threshold level is exceeded; and wherein
    current flowing through said impedance is proportional to the level of beam current demand in excess of said threshold level, and is supplied to said input of said amplifier means to determine the operation of said amplifier means within said control range and to said high voltage supply means as additional beam current for said kinescope when said threshold current level is exceeded; and means for coupling said output control signal to said kinescope to oppose increasing current conduction thereof in accordance with the magnitude of said control signal.

11. In a television system for processing image representative composite video signals, said system including a luminance channel for processing a luminance component of said video signals, and a kinescope for reproducing an image in response to video signals transmitted via said luminance channel, apparatus comprising:

a source of current of a given level coupled to said kinescope for supplying beam currents thereto in accordance with the current demand of said kinescope below a threshold level, said given current level corresponding to said threshold level above which it is desired to oppose increases in beam current;

means for deriving a control signal representative of the magnitude beam current when said threshold level is exceeded, including a transistor having an input electrode coupled to said current source and an output electrode for providing said control signal;

an impedance of predetermined magnitude direct current coupled from said input electrode to said input electrode for providing degenerative feedback for said transistor to determine, for said transistor, a dynamic operating control range when said threshold level is exceeded; and wherein feedback current provided by said impedance is proportional to the level of beam current demand in excess of said threshold level, and is supplied to said input electrode of said transistor to determine the operation of said transistor within said control range and to said kinescope as additional beam current when said threshold level is exceeded; and means for coupling said output control signal to said luminance channel, for varying said luminance component in a direction to oppose increasing current conduction of said kinescope in accordance with the magnitude of said control signal.

12. Apparatus according to claim 11, wherein:
said transistor is arranged in common emitter configuration and said input and output electrodes correspond to base and collector electrodes.

13. Apparatus according to claim 12, and further comprising:
high voltage supplying means for providing operating potential for said kinescope; and wherein
said source of current is coupled to said base electrode of said transistor and to an input of said high voltage supplying means, current supplied to said input being representative of current drawn by said kinescope.

14. Apparatus according to claim 13, wherein:
said source of current includes a current determining impedance of given magnitude for establishing said threshold level independent of said magnitude of said dynamic control range.

* * * * *